United States Patent [19]

Takahashi

[11] Patent Number: 5,376,982
[45] Date of Patent: Dec. 27, 1994

[54] FILM LOADING MECHANISM OF A CAMERA

[75] Inventor: Keita Takahashi, Hachioji, Japan

[73] Assignee: Olympus Optical Co., Ltd., Tokyo, Japan

[21] Appl. No.: 13,771

[22] Filed: Feb. 5, 1993

[30] Foreign Application Priority Data

Feb. 7, 1992 [JP] Japan .................................. 4-56770

[51] Int. Cl.$^5$ ............................................ G03B 17/02
[52] U.S. Cl. ................................. 354/159; 354/173.1
[58] Field of Search ...................... 354/94, 159, 173.1, 354/173.11, 203, 206

[56] References Cited

U.S. PATENT DOCUMENTS

5,010,357 4/1991 Misawa ................................ 354/159

FOREIGN PATENT DOCUMENTS

58-116529 7/1983 Japan .
62-156641 7/1987 Japan .
62-215256 9/1987 Japan .

Primary Examiner—Howard B. Blankenship
Attorney, Agent, or Firm—Louis Weinstein

[57] ABSTRACT

In a camera capable of changing a photographing frame size defined in a photographing aperture, frame size limit members are moved, at an initial stage of film feeding, to a position to form a frame size smaller than an ordinary frame size or to a position to intrude further into the aperture by exceeding a position at which the frame size smaller than the ordinary frame size is formed, irrespective of a selecting position of a frame size changeover operation member, thereby preventing a leading end portion of the film fed out of a film cartridge from entering the aperture during initial film feeding.

67 Claims, 14 Drawing Sheets

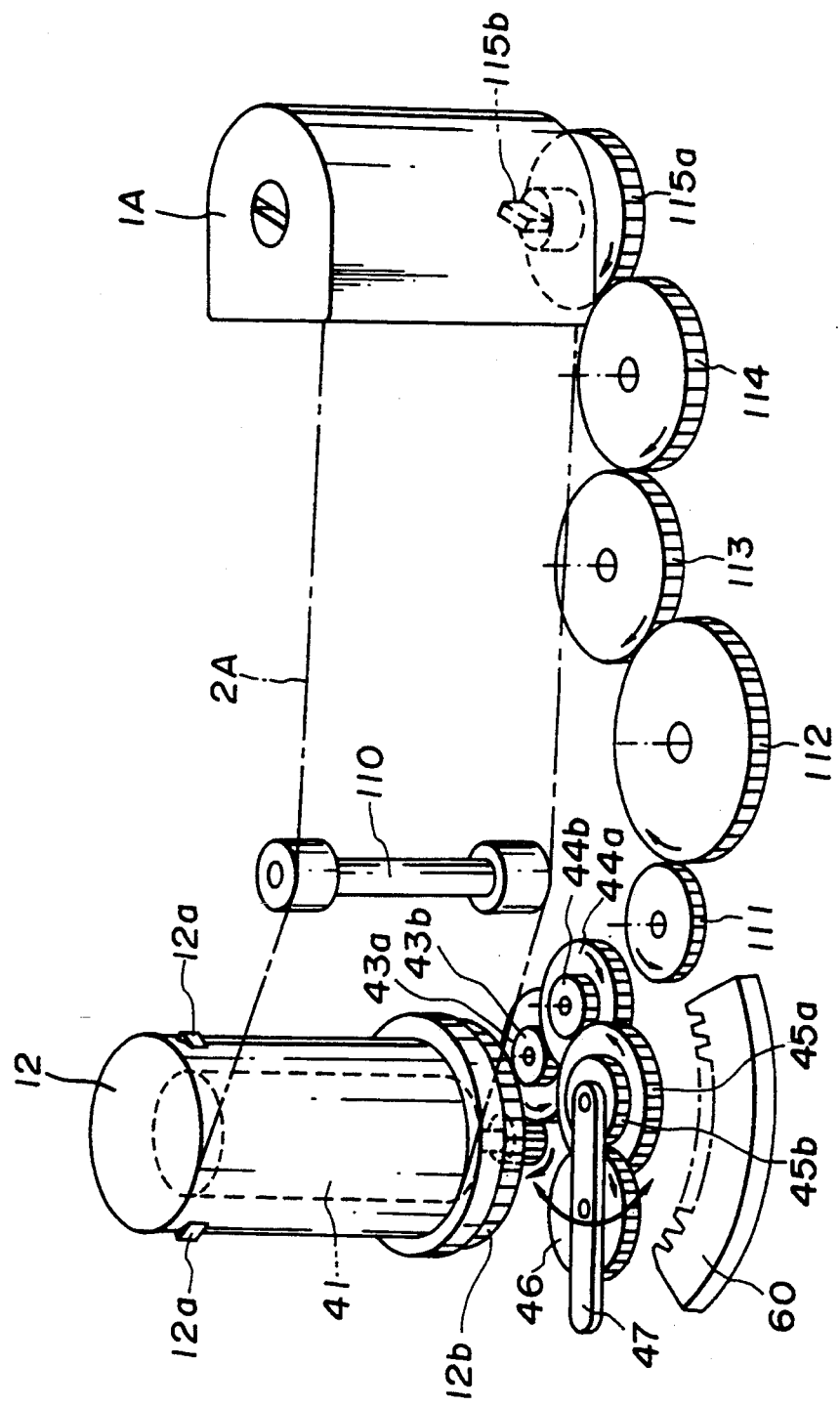

FILM LOADING MECHANISM OF A CAMERA

BACKGROUND OF THE INVENTION

1. Field of the Invention

This invention relates to a film loading mechanism of a camera and, more particularly, to an automatic loading mechanism for loading a roll film in a camera and automatically winding an end portion of the film around a film take-up spool.

2. Description of the Related Art

Film loading mechanisms, such as those disclosed in Japanese Laid-Open Patent Application Sho/62-156641 and Japanese Laid-Open Patent Application Sho/62-21525, are known as conventional mechanisms for loading a roll film in a camera by an easy operation. Also, a self-driving type easy-loading mechanism which sets a film cartridge accommodating a roll film in a camera and which loads the film by rotating a film spool in the film cartridge so that the film is fed out of the film cartridge has been proposed.

On the other hand, a frame-size-changeable camera capable of photographing while selecting one of an ordinary size and a smaller size of an image frame on a film size has recently been provided. For example, this type of camera is arranged to photograph an image on a 35 mm width roll film and in accordance with one of an ordinary 36×24 mm frame size called Leica size, and a smaller frame size, e.g., 36×13 mm size called a panoramic size. As a camera of this type, a camera capable of using each of a film having perforations and a film having no perforations has also been proposed. Using a film having no perforations in such a camera is advantageous because the image frame size can be increased.

In a case where the above-described roll film is used by being loaded in a camera automatically or loaded in an easy-loading manner, a problem described below is encountered. That is, as is well known, the roll film has an end portion, called a leader portion, which is reduced in width by being partially cut along one side. This portion is formed in order that the film can be smoothly wound around a film take-up spool at the time of film loading. In a film easy-loading mechanism, when this leading end portion having a small width passes over an aperture of a camera body, i.e., a photographing opening of the camera body at an initial film feeding stage, there is a risk of the leading end portion entering the aperture, resulting in a film feeding failure or damage to a curtain surface of a focal plane shutter.

SUMMARY AND OBJECTS OF THE INVENTION

A main object of the present invention is to provide a camera film loading mechanism arranged to solve the above-described problem of the conventional film loading mechanism by utilizing a limit member for changing the photographing frame size in a frame-size-changeable camera.

Another object of the present invention is to provide a camera film loading mechanism which forcibly intrudes a frame size limit member into the photographing aperture at an initial film loading stage to prevent the leading end of the film from entering the aperture.

To achieve these objects, according to the present invention, there is provided a camera capable of changing a photographing frame size defined in a photographing aperture, wherein at least one frame size limit member is moved, at an initial stage of film feeding, to a position such as to form a photographing frame size smaller than an ordinary photographing frame size or to a position such as to intrude further into the aperture by exceeding the position at which the photographing frame size smaller than the ordinary photographing frame size is formed, irrespective of a selecting position of a frame size changeover operation member, whereby a leading end portion of the film fed out of a film cartridge is prevented from entering the aperture during initial film feeding.

These and other objects, features and advantages of the present invention will become apparent from the following detailed description of the invention.

BRIEF DESCRIPTION OF THE DRAWINGS

FIG. 16 is an enlarged perspective view of a film feed mechanism in a film loading mechanism of a camera in accordance with a third embodiment of the present invention.

DESCRIPTION OF THE PREFERRED EMBODIMENTS

Figure 1:
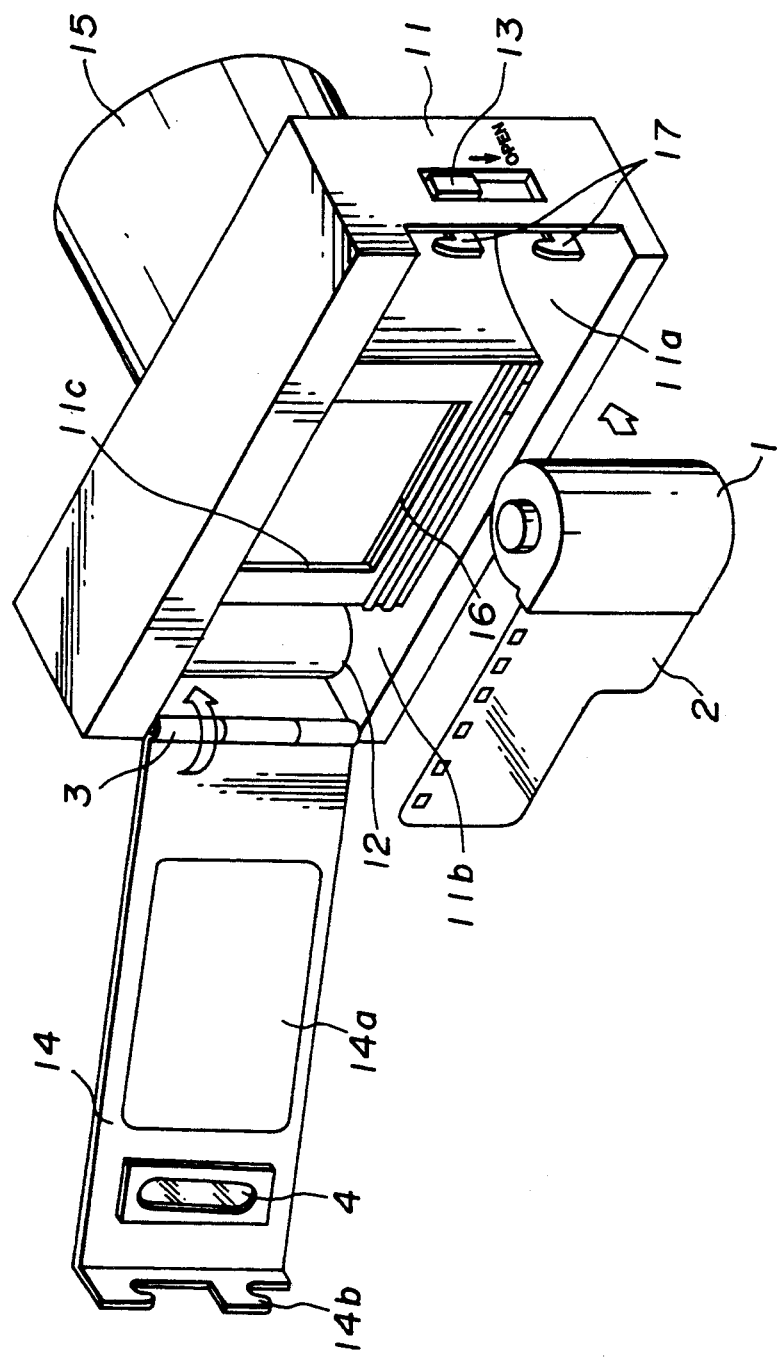
FIG. 1 is a perspective view of a camera having a film loading mechanism in accordance with a first embodiment of the present invention in state where a back cover is open.
Figure 2:
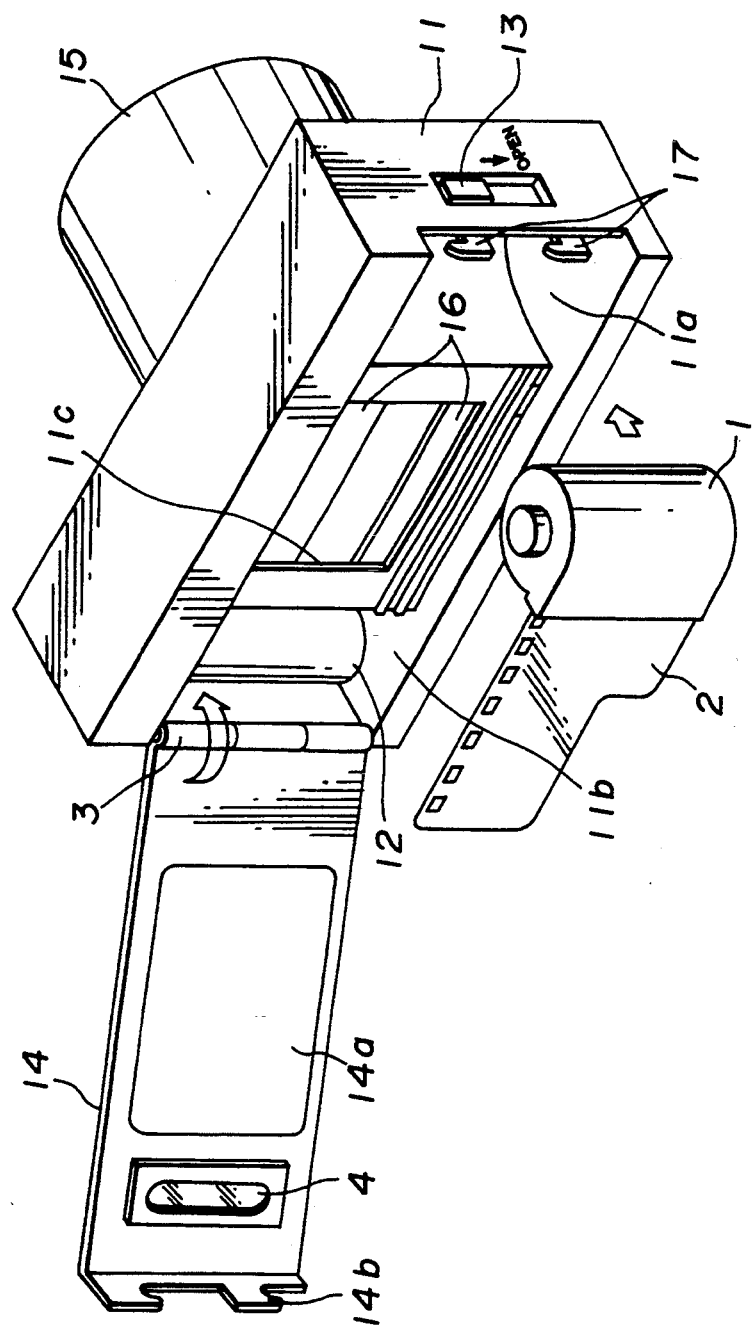
FIG. 2 is a perspective view of the camera having the film loading mechanism of the first embodiment in a state of being operated to change the photographing frame size while the back cover is opened.

FIGS. 1 and 2 show a frame-size-changeable camera having a film loading mechanism in accordance with the first embodiment of the present invention. This camera is constructed so that the photographing frame size can be changed between an ordinary photographing frame size (hereinafter referred to as "first photographing frame size") and a smaller panoramic photographing frame size (hereinafter referred to as "second photographing frame size").

FIG. 1 shows a state in which a pair of frame size limit members (opening limit mask members) 16 (see FIG. 4) are retracted out of an aperture formed in a camera body 11 and the first photographing frame size is thereby formed in accordance with the size of the aperture. FIG. 2 shows a state in which the frame size limit members 16 are intruded into the aperture 11c to form the second photographing frame size smaller than the first photographing frame size (see FIG. 6).

The camera has a photographing lens 15 provided at its front central portion. The aperture 11c defining the first photographing frame size is formed in a back central portion of the camera body 11. A film cartridge accommodation chamber 11a for accommodating a film cartridge 1 is provided on one side of the aperture 11c and a spool accommodation chamber 11b in which a film spool 12 for taking up a film 2 is accommodated is provided on the other side of the aperture 11c.

One of the opposite side portions of a back cover 14 capable of opening and closing a back side opening of the camera body 11 is attached to a back side portion of the camera body 11 through a hinge 3. The other side portion of the back cover 14 includes hook portions 14b which are engaged with hooks 17 provided on the camera body 11 to lock the back cover 14 when the back cover 14 is closed. To open the back cover 14, a lock release member 13 is moved in an opening direction to cancel the locked state of the back cover 14, thereby enabling the back cover 14 to be opened.

A pressure plate 14a for pressing a reverse surface of the film extended over the aperture 11c is provided on an internal surface of the back cover 14 so as to be resiliently movable. A checking window 4 for checking whether the film cartridge 1 is set is formed in the back cover 14.

Figure 3:
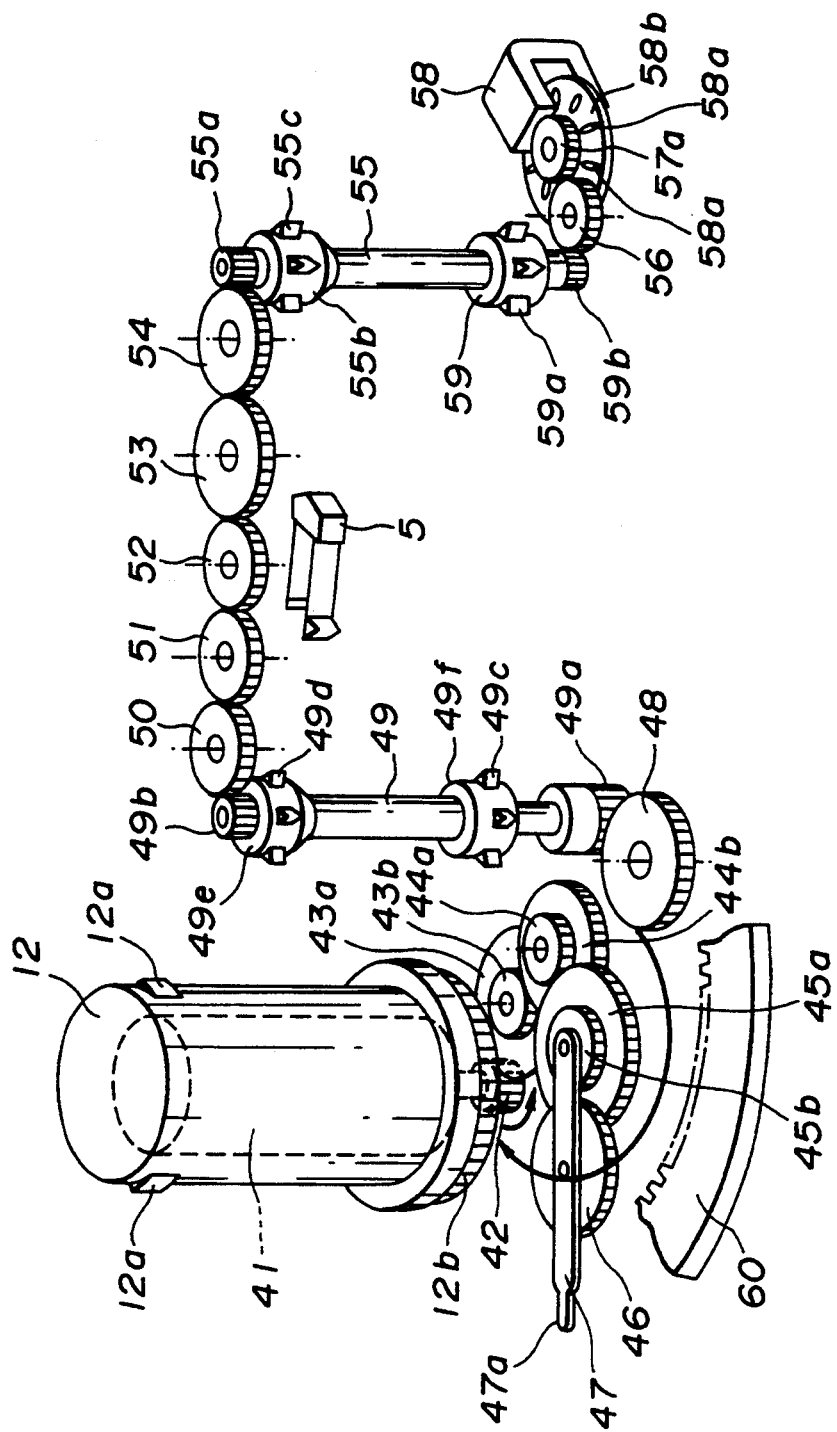
FIG. 3 is an enlarged perspective view of a film feed mechanism of the camera having the film loading mechanism of the first embodiment.

FIG. 3 shows a film feed mechanism provided in the camera body 11.

A motor 41 capable of rotating in each of normal and reverse directions is provided in the film spool 12. The motor 41 is attached to a stationary member (not shown) fixed on the camera body 11, and a pinion gear 42 is fixed to an output shaft of the motor 41. The pinion gear 42 meshes with a large-diameter gear portion 43a of a first speed reducing gear formed of a two-stage gear rotatably mounted on the stationary member. A small-diameter gear portion 43b of this gear meshes with a large-diameter gear portion 44b of a second speed reducing gear formed of a two-stage gear rotatably mounted on the stationary member. A small-diameter gear portion 44a of this gear meshes with a large-diameter gear portion 45a of a third speed reducing gear formed of a two-stage gear rotatably mounted on the stationary member. A small-diameter gear portion 45b of this gear forms a sun gear of a planetary gear mechanism constituting a clutch mechanism. A planet gear 46 meshes with the sun gear 45b. A supporting shaft of the planet gear 46 is connected to a supporting shaft of the sun gear 45b by a connection lever 47 through a well-known friction member. The connection lever 47 has an end portion extending outwardly from its planet gear 46 connection portion, and a changeover projection 47a is formed on this extending end portion of the connection lever 47. The changeover projection 47a serves to operate an engaging lever 63 and a changeover lever 61 associated with a photographing frame size changeover mechanism (see FIGS. 5 and 6) described later.

The clutch mechanism including the above-described planetary gear mechanism serves to change the transmission of driving forces for a first film feeding step in which an initial feed operation for preliminary winding of a loaded film is performed and a second film feeding step in which an ordinary film winding operation is performed. During first film feeding, the planet gear 46 revolves around the sun gear 45b counterclockwise as viewed in FIG. 3 and meshes with a transmission gear 48 to transmit the torque of the motor 41 to the transmission gear 48. During second film feeding, the planet gear 46 revolves around the sun gear 45b clockwise as viewed in FIG. 3 and meshes with a spool gear 12b formed on a lower end portion of the film spool 12 to transmit the torque of the motor 41 to the spool gear 12b.

An inner gear 60 is provided outside an orbiting path of the planet gear 46. The planet gear 46 meshes with the inner gear 60 to revolve reliably. The inner gear 60 is formed in an area such that it does not mesh with the planet gear 46 when the planet gear 46 is meshing with the spool gear 12b or the transmission gear 48. The inner gear also serves to maintain the planet gear 46 at a neutral position at which the planet gear 46 meshes with neither the spool gear 12b nor and the transmission gear 48.

Engaging claws 12a are provided on an outer circumferential portion of the film spool 12 to catch perforations of the film at the time of film winding.

The transmission gear 48 meshes with a drive gear 49a fixed to a lower end portion of a first sprocket shaft 49 rotatably provided on the camera body 11. The sprocket shaft 49 is disposed in the vicinity of the film spool 12 and by the side of a film feed path. As in the case of a well-known sprocket construction, sprocket wheels 49e and 49f having a plurality of engaging claws 49d and 49c formed on their circumferential surfaces and engageable with perforations of the film are provided on portions of the sprocket shaft 49 close to upper and lower ends of the sprocket shaft 49. A torque transmission gear 49b is fixed to an upper end portion of the sprocket shaft 49. The transmission gear 49b meshes with a first gear 50 of a gear train formed of a plurality of gears 50 to 54. The first sprocket shaft 49 is connected to a second sprocket shaft 55 through this gear train.

The second sprocket shaft 55 is rotatably disposed on the camera body 11 in the vicinity of the accommodated film cartridge and by the side of the film feed path. A transmission gear 55a fixed to an upper end portion of the sprocket shaft 55 meshes with a final gear 54 of the above-mentioned gear train. A sprocket wheel 55b is formed integrally with the sprocket shaft 55 at a position close to the upper end thereof. A plurality of engaging claws 55c are formed on a circumferential surface of the sprocket wheel 55b so as to be engageable with film perforations.

A counting sprocket wheel 59 is axially supported on a lower portion of the second sprocket shaft 55 independently of the sprocket wheel 55b so as to be rotatable relative to the sprocket shaft 55. A plurality of engaging claws 59a are also formed on a circumferential surface of the counting sprocket wheel 59 so as to be engageable with film perforations. A photointerrupter operating gear 59b is formed integrally on the second sprocket shaft 55 below the counting sprocket wheel 59. Accordingly, the counting sprocket wheel 59 is rotated only by the movement of the film.

The operating gear 59b serves to rotate a drive gear 57a through an intermediate gear 56. Slits 58a provided in disk 58b are rotated with the drive gear 57a, and the amount of rotation of the slits 58a is detected through a photointerrupter (hereinafter referred to as "PI") provided separately of the drive gear 57a.

Phases of the plurality of engaging claws 49d, 49c of the sprocket wheels 49e, 49f, the plurality of engaging claws 55c of the sprocket wheel 55b and the plurality of engaging claws 59a of the sprocket wheel 59 are controlled so that each engaging claw can engage correctly with film perforations.

A film detection switch 5 for detecting the existence/non-existence of a film is attached to the camera body 11 so that a portion of the detection switch 5 is positioned in the film feed path. The film detection switch 5 is turned on when a film is present in the film feed path and is turned off when no film is in the film feed path.

Figure 6:
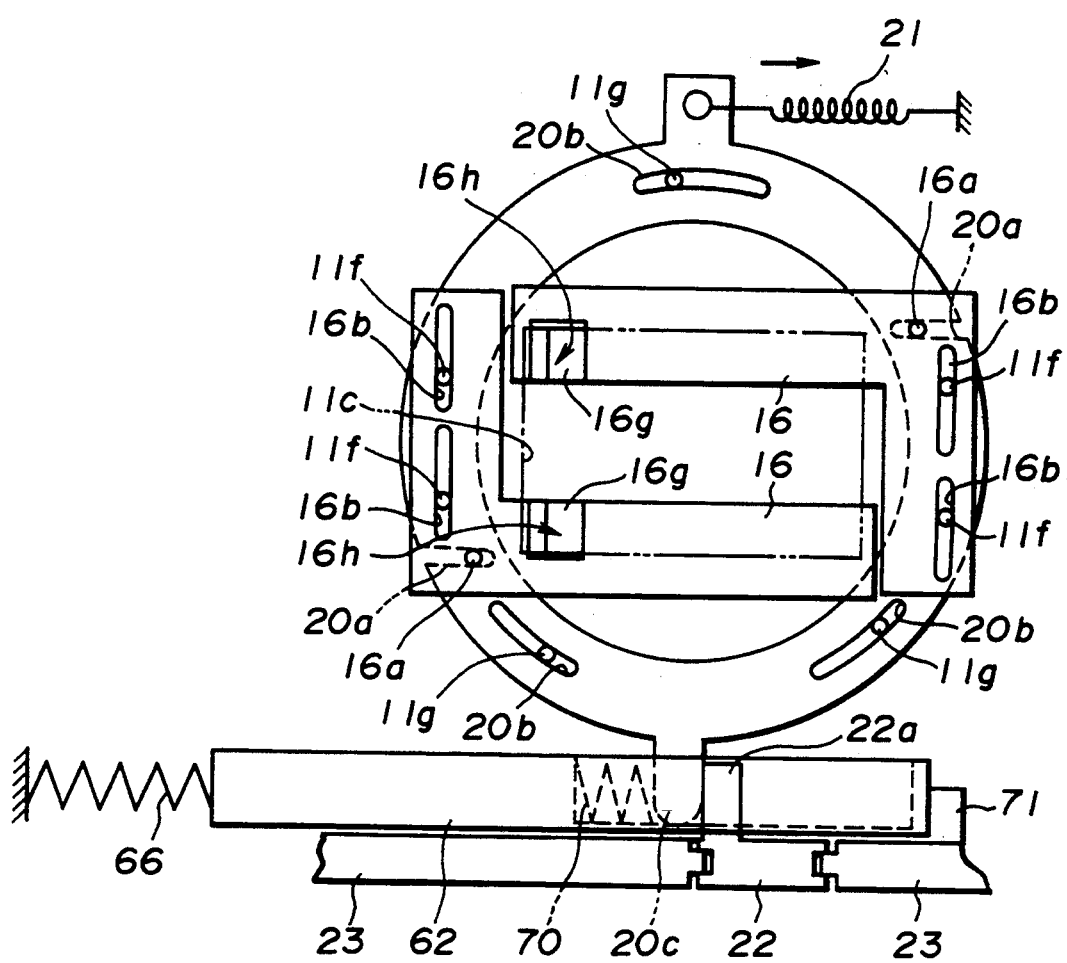
FIG. 6 is an enlarged front view of an operated state of the frame size limit members in the camera having the film loading mechanism of the first embodiment.

The frame size changeover mechanism for moving the pair of frame size limit members 16 between the retracted position (see FIG. 4) and the intruded position (FIG. 6) with respect to the aperture 11c will now be described with reference to FIGS. 4 and 6. The pair of frame size limit members 16 are each formed of an L-shaped thin resilient plate and are disposed around the aperture 11c so that their horizontal portions and vertical portions face each other. Two elongated guide holes 16b are formed in the vertical portion of each frame size limit member 16 by being arranged in the longitudinal direction of vertical portion. Fixed pins 11f provided on the camera body 11 are fitted in the elongated holes 16b. Accordingly, the pair of frame size limit members 16 can be slid in a vertical direction of the photographing frame closer to or away from each other to change the opening size of the aperture 11c.

Projections 16g are provided on the front side of the pair of frame size limit members 16 opposite to the aperture 11c to prevent the leading end of the film from entering the aperture by being caught by an end portion of the aperture 11c when the film leading end is fed across the aperture 11c. That is, the projections 16g have slant surfaces 16h (see FIG. 9) for displacing the film leading end in a direction such that the film leading end moves away from the aperture 11c. One of the projections 16g is attached to the horizontal portion of the upper limit member 16 close to an extreme end thereof, while the other projection 16g is attached to the horizontal portion of the lower limit member 16 close to an angled inside corner thereof.

Figure 9:
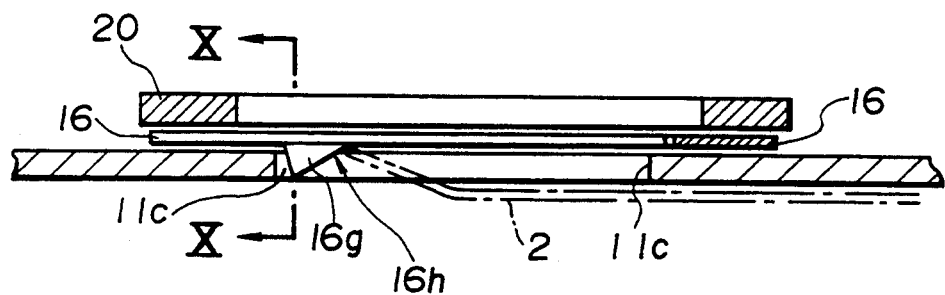
FIGS. 9 to 11 are an enlarged transverse sectional view and enlarged longitudinal sectional views, respectively, of a state where the photographing frame size limit members are intruded into the aperture and a state where the limit members are retracted out of the aperture.
Figure 10:
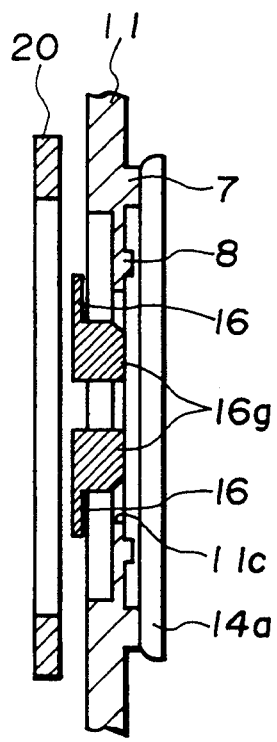

At an initial state of automatic loading of film 2, the pair of frame size limit members 16 are placed in the position of being intruded into the aperture 11c, whereby the projections 16g are also placed in the aperture 11c, as shown in FIGS. 9 and 10, thereby preventing the film leading end portion from entering the aperture 11c. When the pair of frame size limit members 16 are moved to the outside of the aperture 11c, they are elastically deformed to be retracted out of the aperture 11c, as shown in FIG. 11.

Figure 11:
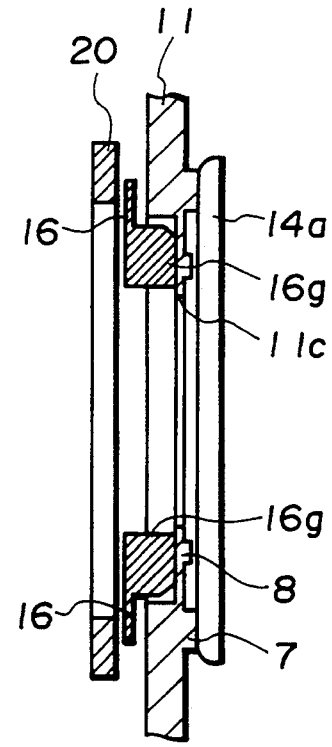

Portions indicated at 7 in FIGS. 10 and 11 represent pressure plate rails contacting the pressure plate 14a, and portions indicated at 8 FIGS. 10 and 11 represent film rails.

A drive ring 20 for moving the pair of frame size limit members 16 is disposed on the reverse side of the frame size limit members 16. Three elongated circular-arc guide holes 20b are formed in the drive ring 20 so as to extend in a circumferential direction. Fixed pins 11g provided on the camera body 11 are fitted in the elongated holes 20b, and the drive ring 20 is thereby supported rotatably. Driving elongated holes 20a are formed in an outer circumferential portion of the drive ring 20 in symmetrical positions by being cut or recessed from the circumferential edge thereof. Drive pins 16a embedded in the reverse surfaces of the pair of frame size limit members 16 are fitted in the elongated holes 20a. Accordingly, when the drive ring 20 is rotated, the pair of frame size limit members 16 are moved vertically through the drive pins 16a moved by the driving elongated holes 20a.

The drive ring 20 is urged by a tension coil spring 21 provided as a first urging means so that the frame size limit members 16 are ordinarily driven in a direction such as to intrude into the aperture 11c. A projection 20c is formed on a lower circumferential portion of the drive ring 20 and is rotated by the frame size changeover mechanism described below.

Figure 4:
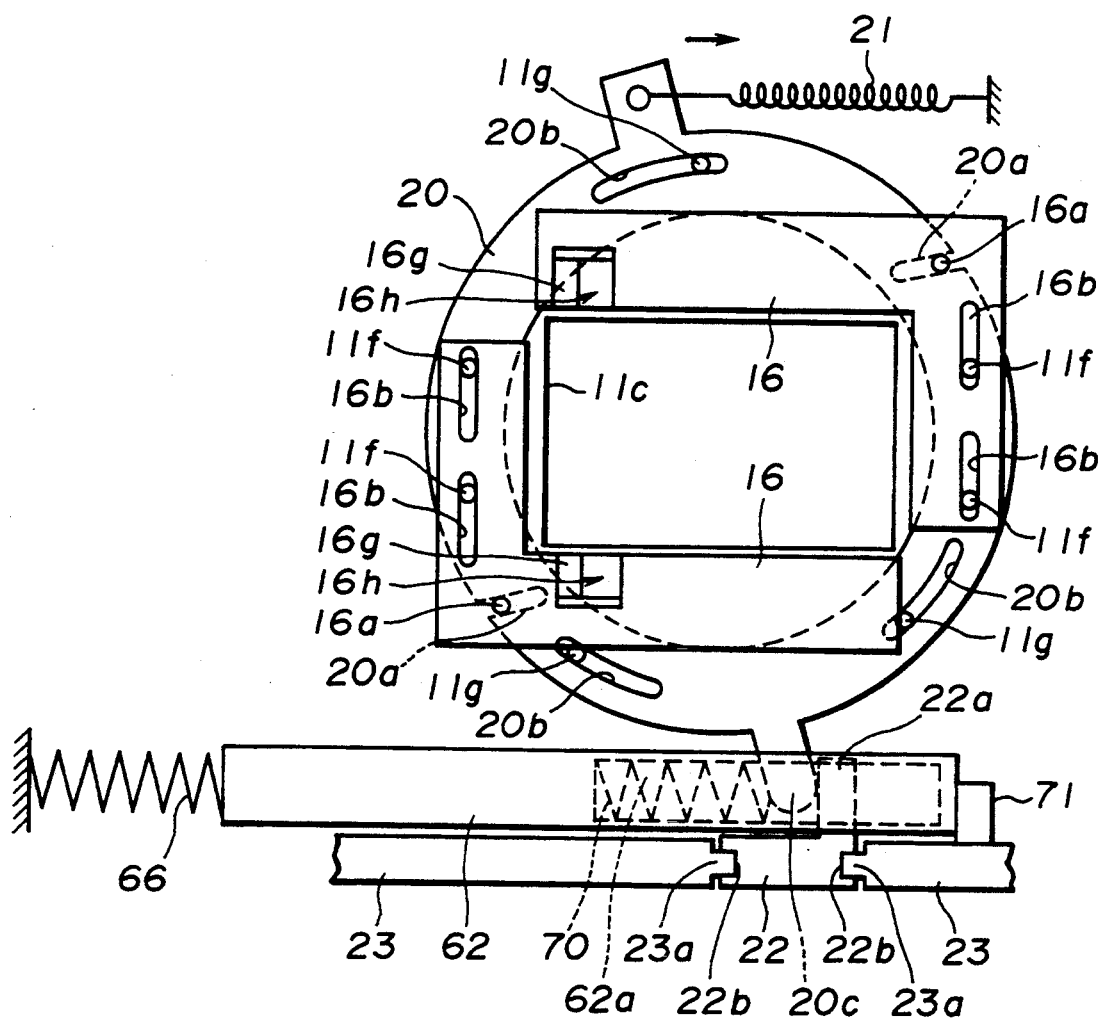
FIG. 4 is an enlarged front view of the camera having the film loading mechanism of the first embodiment, showing a relationship between frame size limit members and a drive ring.
Figure 5:
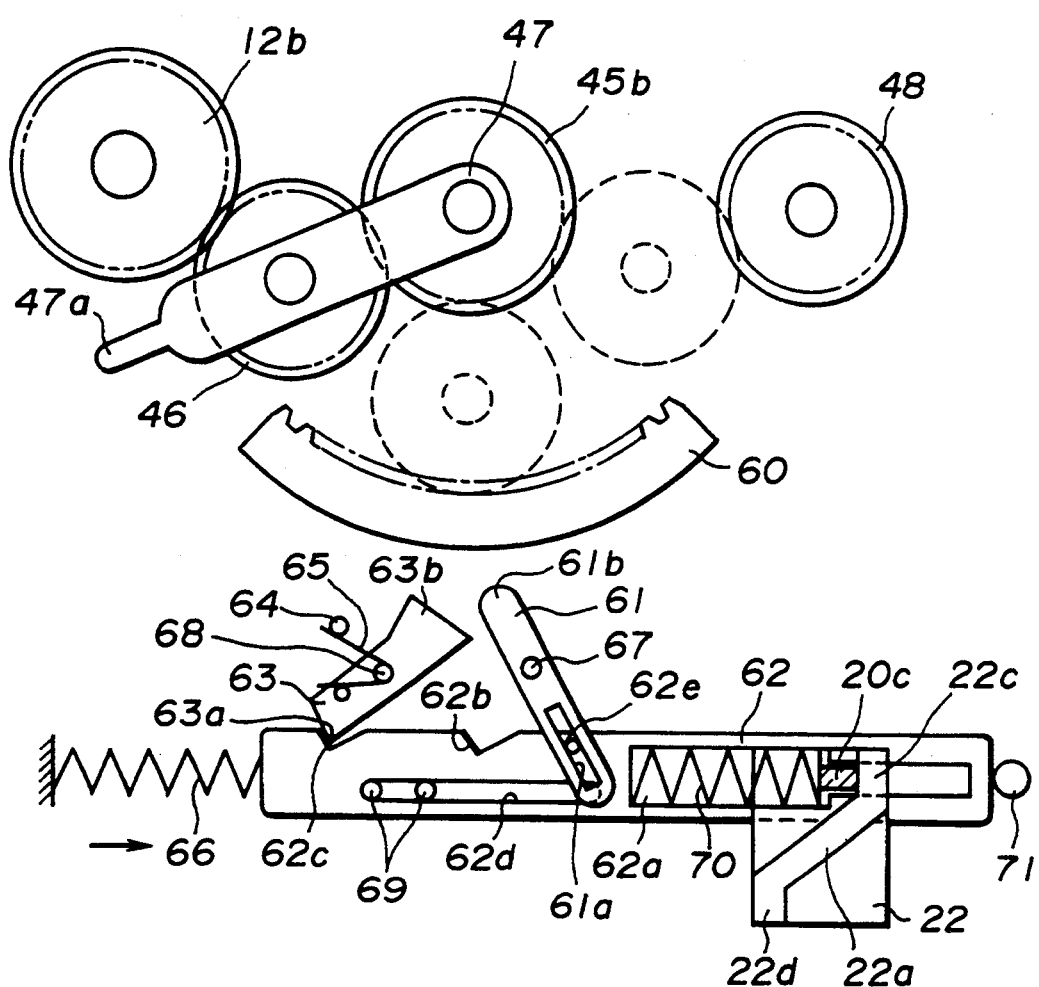
FIG. 5 is an enlarged plan view of an important portion of a changeover operation mechanism of the film feed mechanism in the camera having the film loading mechanism of the first embodiment.

The frame size changeover mechanism has a main portion which includes, as shown in FIGS. 4 and 5, a slide member 62 provided so as to be movable on a lower plate 23 of the camera body 11, a changeover operation member 22 attached to the lower plate 23 so as to be slidable in a direction perpendicular to the sliding direction of the slide member 62 and having on its upper surface a slant cam projection 22a for changing the frame size, the projection 20c having an extreme end inserted in an open channel 62a formed in the slide member 62, and a compression coil spring 70 provided as a second urging means in the open channel 62a to press the projection 20c against a cam surface of the slant cam projection 22a by a compression resiliency force greater than the tension resiliency force of the tension coil spring 21.

The changeover operation member 22 is operated by being pressed from the outside of the camera. The changeover operation member 22 has dovetail grooves 22b formed in its two side surfaces so as to be fitted to dovetails 23a formed in inner surfaces of an arrangement hole formed in the lower plate 23. The changeover operation member 22 is pressed into the camera body in a direction perpendicular to the plane of projection of FIG. 4, with its dovetail grooves 23a fitted to the dovetails 23a. The cam surface of the slant cam projection 22a is slanted in a direction such as to rotate the projection 20c clockwise (as viewed in FIG. 4) by pressing the same when the changeover member 22 is pressed into the camera body. The slant cam projection 22a has short wall portions 22c and 22d formed at its upper and lower ends. The slant cam projection 22a is inserted in the open channel 62a and has an inserted portion against which the projection 20c is pressed by the coil spring 70.

The open channel 62a is formed in a right half portion (as viewed in FIG. 5) of the slide member 62, and an elongated guide hole 62d is formed in a left half portion of the slide member 62 so as to extend in the longitudinal direction of the same. A fixed pin 69 embedded in the lower plate 23 of the camera body 11 is fitted in the elongated hole 62d to move the slide member in the film feeding direction. A compression coil spring 66 is provided to ordinarily press a left end surface of the slide member 62 so that the slide member 62 slides rightward to press the projection 20c of the drive ring 20 against the slant cam projection 22a of the changeover operation member 22. Therefore, ordinarily, i.e., at the time of ordinary photography, the drive ring 20 is rotated counterclockwise, as shown in FIG. 4, so that the frame size limit members 16 are retracted from the aperture 11c.

The force of the coil spring 66 is set so as to be greater than the resiliency force of the coil spring 70 urging the projection 20c of the drive ring 20. Therefore, ordinarily, i.e., at the time of ordinary photography, the slide member 62 slides rightward and is stopped with its right end surface contacting a stopper pin 71 embedded in the lower plate 23 of the camera body 11. When the slide member 62 moves to the position shown in FIG. 8, the coil spring 70 is set in a state of cancelling the application of the pressing force to the projection 20c.

The thus-constructed frame size changeover mechanism and the above-described film feed mechanism are operated by being linked as described below. That is, as shown in FIG. 5, the engaging lever 63 and the changeover lever 61 are provided between the inner gear 60 in the film feed mechanism and the slide member 62 in the frame size changeover mechanism.

The changeover lever 61 is provided on the open groove 62a side of the slide member 62 and is supported on a fulcrum at its intermediate portion on a supporting shaft 67 embedded in the lower plate 23 of the camera body 11. The changeover lever 61 has an arm extending over the slide member 62. A drive pin 62e fixed on the slide member 62 is fitted in an elongated hole 61a formed in this arm. An end 61b of another arm of the changeover lever 61 extends in the opposite direction into a rotating path of a changeover projection 47a of the connection lever 47.

The engaging lever 63 is provided on the coil spring 66 side and is supported on a fulcrum at its intermediate portion on a supporting shaft 68 embedded in the lower plate 23 of the camera body 11. The engaging lever 63 has an arm extending toward the slide member 62 and having an engaging claw 63a formed at its extreme end. The engaging lever 63 is urged by a torsion spring 65 wound around the supporting shaft 68 and having two leg portions stretched between a fixed pin 64 and the lever 63 so as to rotate counterclockwise on the supporting shaft 68. The engaging claws 63a is thereby brought into engagement with one of the engaging recesses 62b and 62c formed in an inner side portion of the slide member 62. An end portion 63b of another arm of the engaging lever 63 extending opposite to the above-mentioned arm extends into the rotating path of a changeover projection 47a of the connection lever 47. The end portion 63b is formed so as to have a chevron-like profile defined by two slant edges.

A photographing frame size changeover operation of the frame-size-changeable camera having the thus-constructed film loading mechanism in accordance with the first embodiment of the present invention will be described below.

In the case of photography using the first photographing frame size (ordinary size), the changeover operation member 22 is set to a position such as to project outward, as shown in FIG. 5. The projection 20c of the drive ring 20 is thereby allowed to be brought into abutment against the vertical wall 22c of the slant cam projection 22a by being urged rightward by the coil spring 70. The drive ring 20 is thereby rotated counterclockwise against the resiliency force of the coil spring 21, and the pair of frame size limit members 16 are moved upward and downward, respectively, by the operation of the elongated drive holes 20a and the drive pins 16a and are retracted out of the aperture 11c, as shown in FIG. 4. Accordingly, the opening of the aperture 11c is set to the first photographing frame size, and the film is exposed through this opening.

Figure 7:
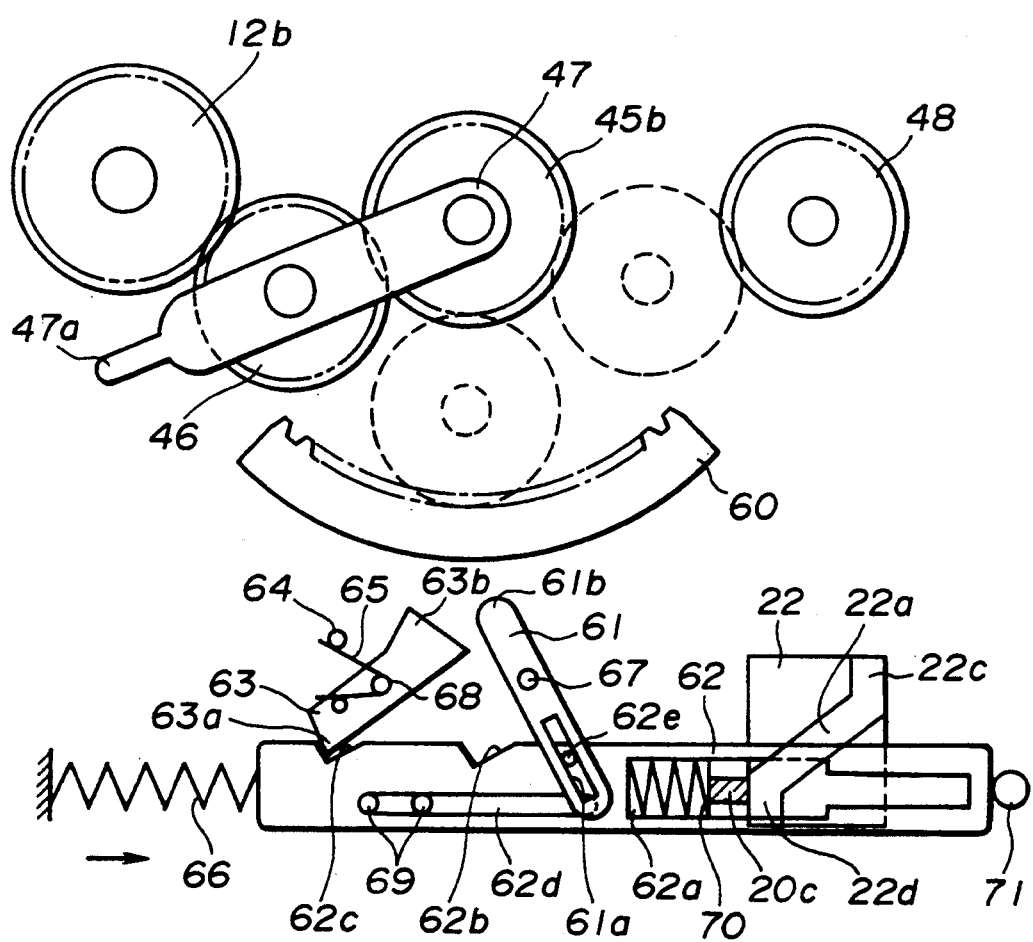
FIGS. 7 and 8 are enlarged plan views of an essential portion of the camera having the film loading mechanism of the first embodiment, showing operated states of the frame size limit members and the changeover operation mechanism.

In the case of the photography using the second photographing frame size (panoramic frame size) smaller than the first photographing frame size, the changeover operation member 22 is pressed to be set to an inner position as shown in FIG. 7. The projection 20c of the drive ring 20 is thereby pressed leftward through the slant cam projection 22a against the resiliency force of the spring 70 to be brought into abutment against the vertical wall 22d of the slant cam projection 22a. The drive ring 20 is thereby allowed to rotate clockwise by the resiliency force of the coil spring 21, and the pair of frame size limit members 16 intrude into the aperture 11c by moving so as to be closer to each other by the operation of the elongated drive holes 20a and the drive pins 16a. Accordingly, the opening of the aperture 11c is set to the second photographing frame size, and the film is exposed through this opening.

The photographing frame size changing operation is thus performed.

Figure 14:
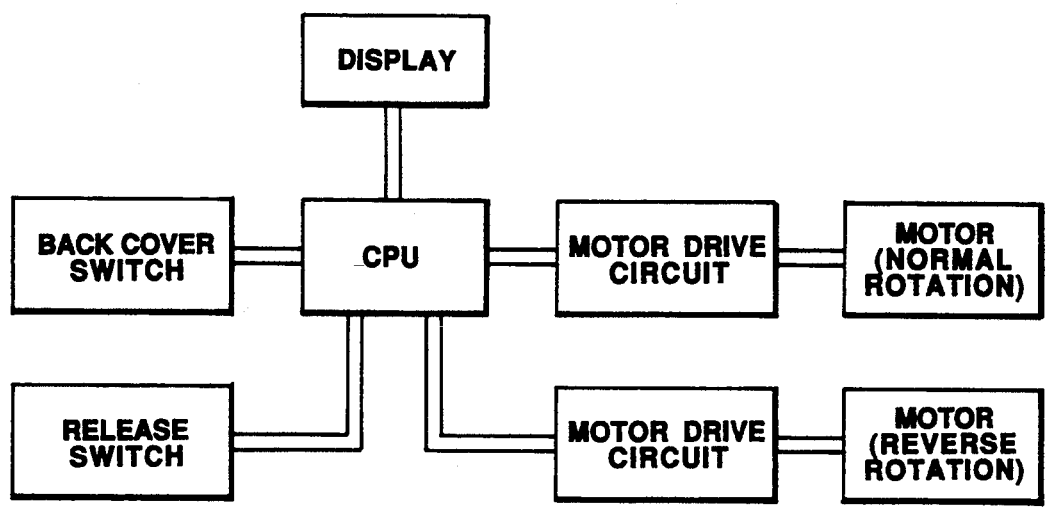
FIG. 14 is a block diagram of an important portion of an electric circuit of the camera having the film loading mechanism of the first embodiment.

Next, a film feeding operation will be described with reference to FIGS. 3 and 14. FIG. 14 is a schematic block diagram of the construction of an electrical circuit of an important portion of the frame-size-changeable camera relating to the film loading mechanism in accordance with this embodiment.

First, the film cartridge 1 (See FIGS. 1 and 2) is loaded in the camera, and the back cover 14 is closed. The closed state of the back cover 14 is detected by the back cover switch and a detection signal is sent to a CPU. In response to this signal, the CPU sends a drive signal to a motor driving circuit. The motor 41 thereby starts rotating in the normal direction to start automatic film loading.

As shown in FIG. 3, when the motor 41 rotates in the normal direction, the pinion gear 42 rotates in a direction opposite to the direction of the arrow. By this rotation, the planet gear 46 revolves and meshes with the transmission gear 48. The torque of the motor 41 is thereby transmitted to the gear 48 to rotate the first sprocket shaft 49 and the second sprocket shaft 55. Since the engaging claws 49d, 49c, and 55c of the sprocket wheels 49e, 49f, and 55b can engage with the perforations of the film 2, the film is fed toward the take-up spool 12 as the sprocket shafts 49 and 55 are rotated. As the film is fed, the film detection switch detecting the existence of the film is turned on. The sprocket wheel 59 is also rotated by this film feeding, and pulses to be counted are output from the PI 58 in accordance with the film feeding from the time when the detection switch 5 is turned on. The motor 41 is stopped when a value obtained by counting these pulses becomes equal to a predetermined value. By this sequence of operations, the leading end of the film is transported to a position such that the film can be wound around the spool 12.

Next, the motor 41 is operated in the reverse direction by a signal from the CPU, and the pinion gear 42 is rotated in the direction of the arrow shown in FIG. 3. The planet gear 46 is thereby released from the state of meshing with the transmission gear 48, and starts revolving toward the spool gear 12b to mesh with the same. The torque of the motor 41 is thereby transmitted and the spool 12 is rotated with the engaging claws 12a engaged with perforations of the film. The film is wound around the circumference of a drum portion of the spool 12 by the spool driving. The extent of feeding of the film at this time is controlled in such a manner that output pulses from the PI 58, representing the amount of rotation of the sprocket wheel 59, is counted and the motor 41 is stopped by being braked when the number of counted pulses becomes equal to a predetermined number. At this time, the number of frames "1" is displayed on a display unit. A photography preparation operation is thus completed. Simultaneously with the start of the automatic loading, a timer is started. If the automatic loading is not completed when a predetermined time elapsed is measured by the timer, the motor is stopped and a mark or symbol "E" is displayed on the display unit to inform a photographer of an automatic loading failure.

Figure 8:
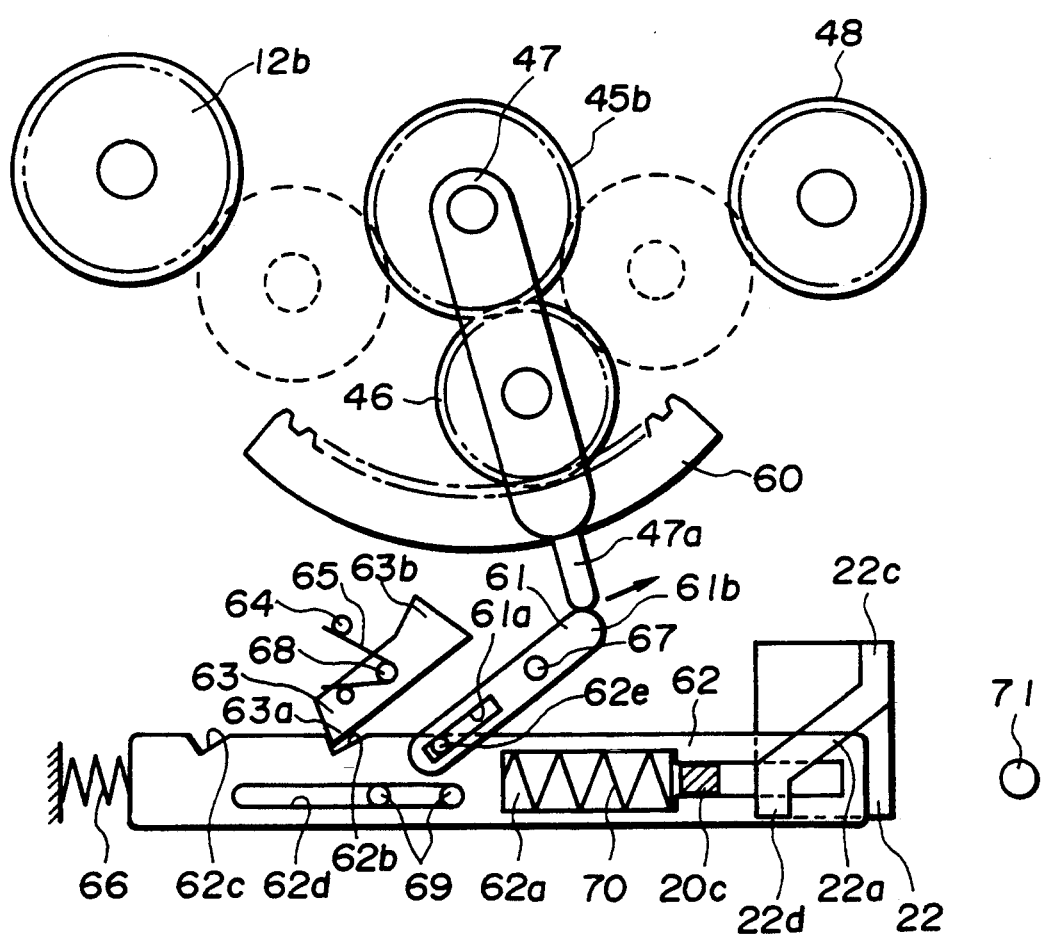

At the initial film feeding stage in the above-described automatic loading, the leading end of the film is prevented from entering the aperture 11c, as mentioned above. That is, as the planet gear 46 revolves to mesh with the transmission gear 48 at the time of initial film feeding, the extreme-end changeover projection 47a of the connection lever 47 is successively brought into contact with the end 63b of the engaging lever 63 and the end 61b of the changeover lever 61 to press these portions so that the engaging lever 63 and the changeover lever 61 are respectively swung clockwise, as shown in FIG. 8. The engaging lever 63 is thereby disengaged from the engaging recess 62c, and the slide member 62 is moved in the film feeding direction against the resiliency force of the spring 66 by the drive pin 62e. After the slide member 62 has been moved through a predetermined distance, the engaging lever 63 engages with the engaging recess 62b to stop and retain the sliding member 62 at the predetermined position.

At this time, the urging force of the spring 70 pressing the projection 20c of the drive ring 20 against the slant cam projection 22a is removed, and the drive ring 20 is therefore rotated clockwise by the resiliency force of the spring 21. The pair of frame size limit members 16 are thereby moved closer to each other to intrude into the aperture 11c irrespective of whether the changeover operation member 22 is at the position indicated in FIG. 5 or 7. Consequently, the opening of the aperture 11c is formed in accordance with the second photographing frame size, and the film leading end is prevented from entering the aperture 11c, as described above with reference to FIGS. 9 and 10.

The lengths of the elongated holes 20b limiting the rotation of the drive ring 20 and the elongated holes 16b limiting the range of movement of the frame size limit members 16 may be selected so that the frame size limit members 16 intrude into the aperture 11c by exceeding the position at which they form the second photographing frame size. The frame size limit members 16 are thereby enabled to intrude into the aperture 11c until the opening of the aperture is further reduced, during the initial film feeding, i.e., while the film leading end portion is being fed by the sprockets. It is thereby possible to improve the reliability of effect of preventing the film leading end from entering the aperture 11c while film loading is performed.

When the connection lever 47 is swung toward the spool 12 after the film driving has been changed from the sprocket driving to the spool driving, the changeover projection 47a at the extreme end of the connection lever 47 causes the engaging lever 63 to rotate clockwise to disengage the engaging lever 63 from the slide member 62. The slide member 62 is thereby allowed to return to the state shown in FIG. 5 or 7 by the urging force of the spring 66.

Figure 12:
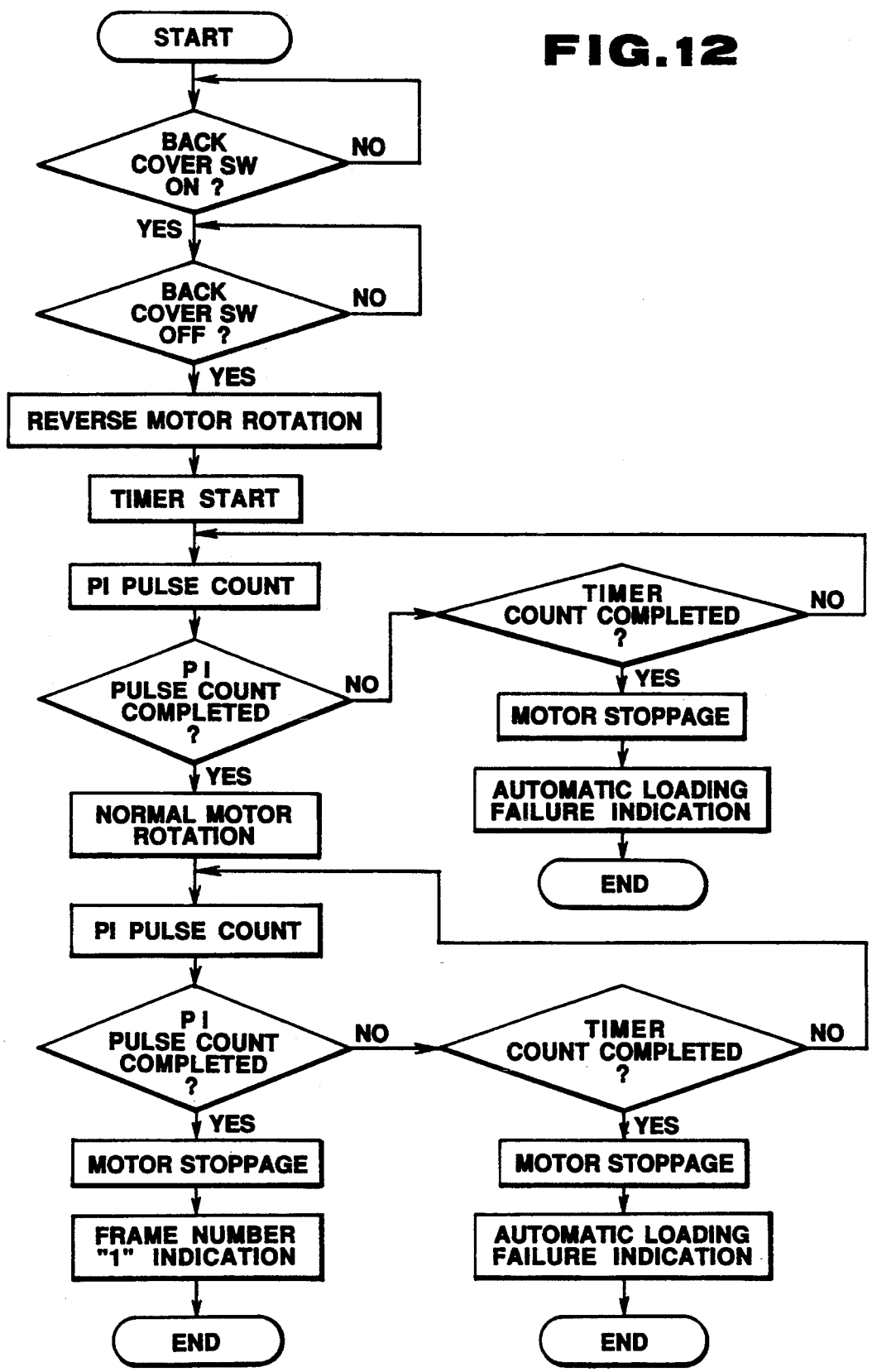
FIG. 12 is a flowchart of the operation of the camera having the film loading mechanism of the first embodiment at the time of automatic loading.

FIG. 12 is a flowchart of the above-described automatic film loading.

When the process is started, the on/off state of the back cover switch (not shown) is checked to determine whether the back cover 14 (see FIG. 1) of the camera is open. In this embodiment, the back cover switch is on when the back cover is open, and the back cover switch is off when the back cover is closed. Accordingly, if the open state of the back cover is confirmed from the on state of the back cover switch, completion of setting the film cartridge and closing the back cover is then checked. If the back cover is closed, the motor 41 (see FIG. 3) is rotated in the reverse direction to drive the film feed system through the planetary clutch, and film feeding is performed by sprocket driving, as described above. At this time, the frame size limit members 16 intrude into the aperture to prevent the film leading end from entering the aperture. Also, the timer is started simultaneously.

With this film feeding, PI pulses are counted. Then, this PI pulse counting is checked and, when a predetermined number of PI pulses is counted, the motor 41 is started in the normal direction to change the film feed system from sprocket driving to spool driving through the planetary clutch. At this time, the aperture is set in accordance with the first or second photographing frame size. Then, PI pulse counting is performed. If counting a predetermined number of PI pulses is not completed, completion of timer counting is checked. If the timer counting is not completed, the process returns to the PI pulse counting. If the timer counting is completed, the motor is stopped and a sign indicating an automatic loading failure is displayed. Thus, if automatic loading is not completed within a predetermined length of time, an automatic loading failure is recognized and the corresponding sign is displayed.

Next, PI pulse counting is performed and completion of counting the predetermined number of PI pulses is checked. If the counting is completed, the motor is stopped and a number of frame "1" is displayed. The process is then terminated. If counting the predetermined number of pulses is not completed, completion of the timer counting is checked. If the timer counting is not completed, the process returns to the PI pulse counting. If the timer counting is completed, then, also in this case, the motor is stopped and the automatic loading failure sign is displayed.

After automatic loading has been performed in this manner, film feeding to the extent corresponding to one frame is performed each time an image is photographed. When a film end is detected after the completion of photography on the film, the planet gear 46 is stopped within the section where it engages with the internal gear 60, that is, it is inhibited from being connected to the spool 12 and sprocket 49 (see FIG. 3), and the motor is rotated in the direction opposite to the film winding direction for a predetermined length of time, thereby rewinding the film.

Figure 13:
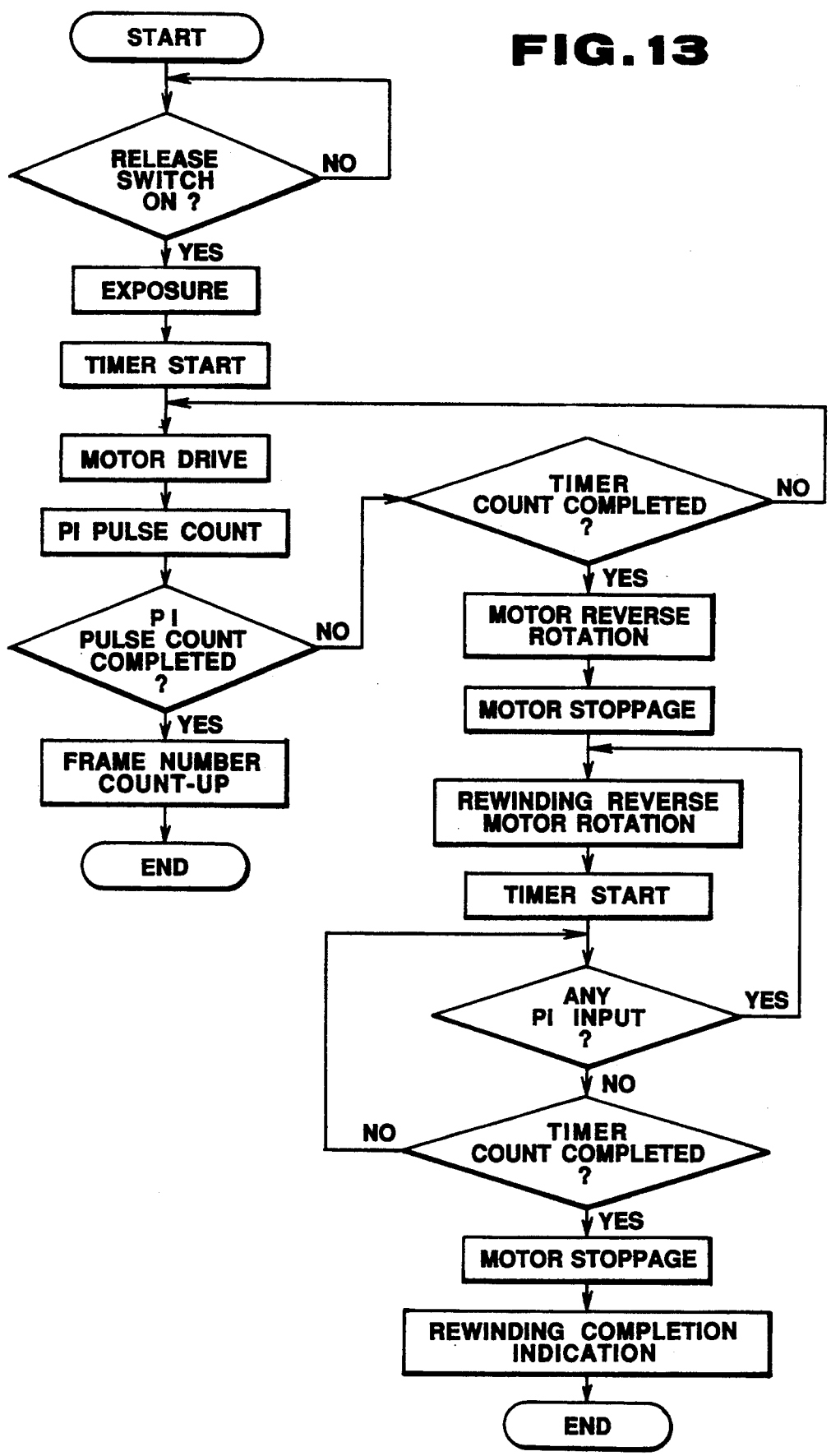
FIG. 13 is a flowchart of the operation of the camera having the film loading mechanism of the first embodiment at the time of rewinding and one-frame feeding.

FIG. 13 is a flow chart of one-frame feeding and rewinding of the film.

When the process is started, the on state of the release switch is checked. If the release switch is not on, the switch checked again. If the release switch is on, an exposure processing operation is performed. Simultaneously, the timer is started. After the exposure operation has been completed, the motor is driven, PI pulses are counted and this PI pulse counting is checked. When a predetermined number of PI pulses is counted, a frame count-up operation is performed and one-frame feeding of the film is completed.

If counting the predetermined number of pulses is not completed at the time of PI pulse count checking, completion of timer counting is checked. If the timer counting is not completed, the process returns to the motor driving. If the timer counting is completed, it is determined that the film end is reached, and rewinding is performed. That is, the motor is rotated to a small extent in the direction opposite to the winding direction and is stopped. The motor is thereby maintained in a state of being disconnected from each of the spool and the sprocket, as described above. This clutch disengagement of the motor is controlled on the basis of time.

The motor is then rotated to rewind the film. At this time, the timer is started. During rewinding, the timer is reset each time a PI pulse input is supplied. Accordingly, an input of any PI pulse is checked. If there is a PI pulse input, the rewinding rotation of the motor is continued. If there is no PI pulse input, completion of timer counting is checked. If the timer counting is not completed, the process returns to the PI input checking. If the timer counting is completed, it is determined that the rewinding is completed. The motor is then stopped and a sign indicating the completion of film rewinding is displayed.

In the film loading mechanism in accordance with the first embodiment, the drive ring 20 is driven by the resiliency force of the spring. Alternatively, the drive ring may be directly driven by a motor.

Figure 15:
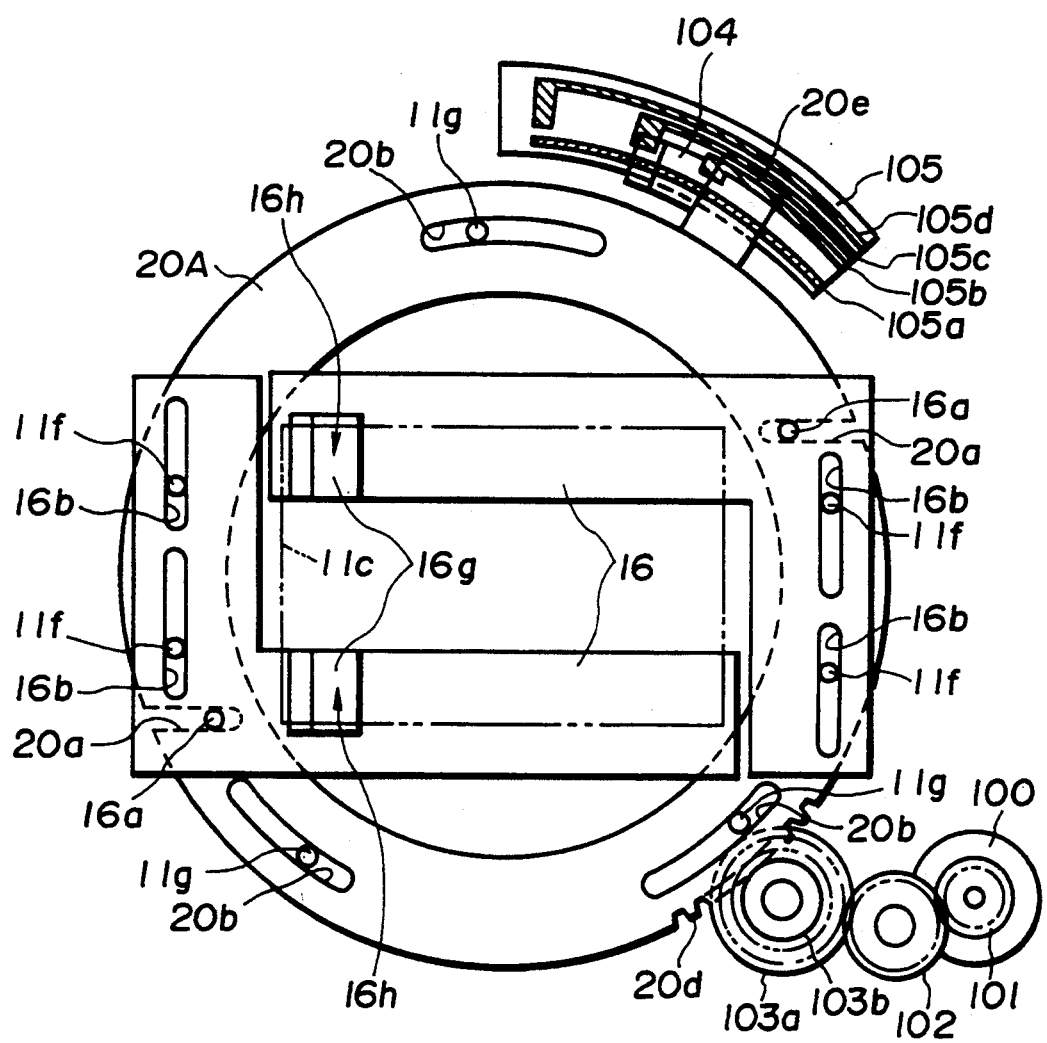
FIG. 15 is an enlarged front view of a film loading mechanism of a camera in accordance with a second embodiment of the present invention, showing an operated state of frame size limit members.

FIG. 15 shows a film loading mechanism in accordance with the second embodiment of the present invention using such motor direct driving. A ring driving motor 100 is fixed on a stationary member of a camera body. A pinion gear 101 is fixed to an output shaft of the motor 100. A large-diameter gear portion 103a of a speed reducing gear meshes with the pinion gear 101 through a transmission gear 102. A small-diameter gear portion 103b of this speed reducing gear meshes with a gear portion 20d formed in a circumferential end portion of a drive ring 20A. A driving force is transmitted from the ring driving motor 100 to the drive ring 20A through this gear mechanism.

A projection 20e is formed on the drive ring 20A so as to project radially outwardly, and a changeover conductive piece 104 is attached to the projection 20e. The conductive piece 104 slides on a printed wiring board 105. Conductor patterns 105a to 105d are formed on the printed board 105. When frame size limit members 16 are moved to a position for forming a first frame size by being retracted out of an aperture 11c, the completion of this operation is detected by an electrical connection between the patterns 105a and 105d through the conductive piece 104. When the frame size limit members 16 are moved to a second frame size formation position by being intruded into the aperture 11c, the completion of this operation is detected by an electrical connection between the patterns 105a and 105c through the conductive piece 104. Also, when the limit members 16 are further intruded into the aperture 11c by exceeding the position at which the second frame size formation position is obtained, the completion of this operation is detected by an electrical connection between the patterns 105b and 105a.

Except for these components and mechanisms, the drive ring 20A and the frame size limit members 16 are constructed in the same manner as those employed in the first embodiment.

In the thus-constructed film loading mechanism in accordance with the second embodiment, when the first frame size or the second frame size is selected by an unillustrated operating switch, the motor 100 is rotated to rotate the drive ring 20A so that the frame size limit members 16 are moved to the above-described predetermined position. At an initial stage of film feeding, the motor 100 is further rotated, irrespective of the operating switch selection position, to move the frame size limit members 16 so that the limit members 16 are further intruded into the aperture 11c relative to the second frame size formation position, thereby preventing the film leading end from entering the aperture 11c.

The film loading mechanism in accordance with the present invention can also be applied to a camera using a self-driving type film cartridge incorporating a spool capable of being rotated to feed a film out of the cartridge.

The third embodiment of the present invention will be described below with reference to FIG. 16. In this embodiment, a frame size changeover mechanism, a motor output speed reduction mechanism, a mechanism for linking the speed reduction mechanism and the frame size changeover mechanism are constructed in the same manner as those of the first embodiment. Therefore, the construction of these mechanism will not be described for the sake of brevity.

The planet gear 46 meshes with a transmission gear 111 which meshes with a gear 112, i.e., a first one of a gear train formed of gears 112 to 114. The gear 114 meshes with a spool driving gear 115a which is supported axially and rotatably on a stationary member of the camera. A coupler 115b capable of engaging with a spool in a film cartridge 1A is provided on a center axis of the gear 115a. By the rotation of the coupler in the direction of the arrow shown in FIG. 16, film 2A is automatically fed out of the film cartridge.

A roller shaft 110 having guide rollers at its upper and lower ends is supported axially and rotatably on the camera body. The leading end of the film 2A fed out of the cartridge is guided by the roller shaft 110 when moved toward the circumference of a drum portion of the spool 12. The process in which the planet gear 46 revolves to change the drive system by the rotation of the motor 41 in the direction of the arrow shown in FIG. 16, and in which the frame size limit members 16 are intruded into the aperture by exceeding the second frame size formation position is the same as that of the first embodiment and, therefore, will not be described for the sake of brevity.

Thus, the present invention can be applied to a camera using a self-driving type film cartridge.

The method of setting the film cartridge in the camera has not been explained with respect to the above-described embodiments. However, needless to say, the present invention can be applied to cameras using any loading method.

A type of camera capable of changing the photographing frame size between an ordinary size and a panoramic size has been described as each of the embodiments of the present invention. Needless to say, the present invention can be applied to cameras capable of changing the photographing frame size between other sizes, e.g., an ordinary size and a half size, and can also be applied to ordinary cameras having no changeover operation member if members corresponding to frame size limit members are provided.

What is claimed is:

1. A film loading mechanism of a camera comprising:
   an aperture frame provided in a camera body and having an aperture defining a photographing predetermined frame size;
   limitation means capable of moving between a position intruding into said aperture and a position retracted from said aperture to selectively change the size of said aperture; and
   setting means for forcibly setting said limitation means to a position at which said limitation means intrudes into said aperture at an initial stage of feeding of a film to prevent a distal end of a film from entering into said aperture during feeding of the film distal end across said aperture.

2. A film loading mechanism according to claim 1, wherein said limitation means comprises a pair of thin, L-shaped plates capable of sliding in a direction approximately perpendicular to a film feeding direction.

3. A film loading mechanism according to claim 2, wherein at least one of said L-shaped plates has a projection for preventing a distal end portion of the film from being caught by an end portion of said aperture.

4. A film loading mechanism according to claim 3, wherein said projection has a slant surface for guiding the leading end portion of the film away from said aperture.

5. A film loading mechanism according to claim 1, wherein said limitation means comprises a pair of thin, L-shaped, resilient plates capable of sliding in a direction approximately perpendicular to a film feeding direction.

6. A film loading mechanism according to claim 5, wherein at least one of said L-shaped plates has a projection having a slant surface extending toward a path of movement of a film being advanced toward said aperture for preventing the leading end portion of the film from being caught by an end portion of said aperture.

7. A film loading mechanism according to claim 1, wherein said setting means comprises:
   a planetary gear mechanism including a planet gear capable of selectively meshing with one of an initial film feeding gear and a film winding gear and a connection lever for connecting said planet gear and a sun gear;
   a drive ring member rotatably provided on the camera body and capable of rotating to move said limitation means between the retracted position and the intruded position with respect to said aperture;
   first urging means for urging said drive ring member so that said limitation means is set to the intruded position with respect to said aperture;
   second urging means having a spring constant greater than a spring constant of said first urging means, said second urging means for urging said drive ring member so that said limitation means is set to the retracted position with respect to said aperture; and
   cancellation means for cancelling an urging force of said second urging means applied to said drive ring member.

8. A film loading mechanism according to claim 7, wherein said cancellation means includes engagement means engaged at a predetermined position when the urging force from said second urging means is cancelled.

9. A film loading mechanism according to claim 7, wherein said cancellation means includes:
   changeover means provided on the camera body and rotated by said connection lever;
   withdrawal means for accommodating said second urging means and for withdrawing said second urging means from said drive ring member by being linked to the rotation of said changeover means;
   urging means for urging said withdrawal means in a predetermined direction relative to the camera body so that said second urging means accommodated in said withdrawal means urges said drive ring member; and
   engagement means for engaging said withdrawal means at a predetermined position.

10. A film loading mechanism of a camera comprising:
    an aperture frame having an aperture defining a given photographing frame size of the camera;
    at least one thin, resilient plate capable of moving in a plane parallel to said frame between a position at which it intrudes into said aperture to reduce the size of said aperture and a position at which it is retracted from said aperture to increase the size of said aperture;
    a drive member for moving said resilient plate; and
    setting means for setting said drive member to forcibly set said resilient plate to a position at which said resilient plate intrudes into said aperture at an initial stage of film feeding to prevent a leader strip of a film from entering said aperture.

11. A film loading mechanism according to claim 10, wherein said drive member comprises a ring-like member having cam means for moving said resilient plate and a projection for setting said resilient plate in a position at which said resilient plate intrudes into said aperture, said projection projecting in a circumferential direction, said ring-like member being capable of rotating about an optical axis passing through said aperture.

12. A film loading mechanism according to claim 11, wherein first bias means urges the projection of said ring-like member in a first rotating direction and second bias means urges the projection in a direction opposite said first rotating direction with a force greater than a force of the first bias means, and wherein the urging of the projection by the second bias means is cancelled at an initial stage of film feeding whereby said projection forcibly intrudes into said aperture.

13. A film loading mechanism according to claim 12, wherein said resilient plate has elongated guide holes receiving first pins provided on a camera body, the elongated guide holes enabling said resilient plate to slide in a direction approximately perpendicular to a film feeding direction, and a drive pin for obtaining a driving force for moving the elongated guide holes relative to the first pins, and wherein said ring-like member has elongated circular-arc-shaped guide holes receiving second pins provided on the camera body, the elongated circular-arc-shaped guide holes limiting rotation about an optical axis passing through the aperture, and a cam groove fitted to a drive pin to enable said resilient plate to move between the retracted position and the intruding position with respect to said aperture.

14. A film loading mechanism according to claim 10, wherein said setting means comprises:
 a planetary gear mechanism including a planet gear capable of selectively transmitting a driving force from a drive source to at least two gear means and a connection lever for connecting said planetary gear and a sun gear;
 first bias means for urging said ring-like member to rotate in a first direction so that said resilient plate intrudes into said aperture;
 second bias means for urging the projection of said ring-like member in a direction opposite to the first direction of said ring-like member so that said resilient plate retracts from said aperture; and
 cancellation means for cancelling the urging of said second urging means by rotation of said connection lever.

15. A film loading mechanism of a camera comprising:
 an aperture for transmission of photographing light reflected from an object for forming an image on a film;
 at least one frame size limit member capable of moving between a first position for defining a first photographing frame size and a second position for defining a second photographing frame size smaller than the first photographing frame size to set the size of said aperture to a predetermined photographing frame size;
 initial feed detection means for detecting an initial feeding operation for feeding a film set in the camera; and
 setting means responsive to said initial feed detection means for forcibly setting said frame size limit member to one of said second position and a position at which said frame size limit member intrudes into said aperture to prevent an end of a film leading strip from entering said aperture.

16. A film loading mechanism of a camera comprising:
 an aperture for transmission of photographing light reflected from an object for forming an image on a film;
 at least one frame size limit member capable of moving between a first position for defining a first photographing frame size and a second position for defining a second photographing frame size smaller than the first photographing frame size to set the size of said aperture to a predetermined photographing frame size;
 initial feed detection means for detecting an initial feeding operation for feeding a film set in the camera;
 setting means responsive to said initial feed detection means for forcibly setting said frame size limit member to one of said second position and a position at which said frame size limit member intrudes into said aperture to prevent an end of a film leading strip from entering said aperture;
 a ring-like member capable of rotating about an optical axis passing through said aperture to move said frame size limit member; and
 drive means for rotating said ring-like member responsive to detection of an initial film feeding operation.

17. A film loading mechanism according to claim 16, further comprising:
 detection means for detecting an angular position of said ring-like member rotated by said drive means; and
 control means for controlling said drive means responsive to a detection output from said detection means.

18. A film loading mechanism of a camera comprising:
 at least one mask member having an aperture for defining a photographing frame size;
 means for advancing a film loaded in said camera toward said mask member upon receipt of an initial film loading request; and
 setting means responsive to said means for advancing, for setting, at an initial stage of film feeding, said mask member to a position at which a smallest photographing frame size is defined to prevent a leading end of a film being advanced from entering into said aperture.

19. A camera comprising:
 mask means for defining a photographing frame size;
 mask opening limitation means capable of moving between a position at which said limitation means intrudes into an aperture in said mask means and a position at said limitation means is retracted from said mask means;
 film feeding means for feeding a film across said mask means;
 clutch means for changeover between a first feeding state for preliminary winding of the film and a second feeding state for ordinary winding;
 setting means for moving said mask opening limitation means to a position at which said mask opening limitation means intrudes into said mask means; and
 control means for controlling said setting means and said film feeding means so that after a film has been set in the camera, and after said mask opening limitation means intrudes into said mask means, the first feeding state is selected to feed the film toward a film take-up spool, and the film fed to the spool is wound around the spool.

20. A camera according to claim 19, wherein said mask opening limitation means includes a projection for preventing a leading end portion of the film from being caught by an end portion of said mask means.

21. A camera according to claim 20, wherein said projection has a slant surface for diverting a leading end portion of the film away from said mask means.

22. A camera according to claim 19, wherein said film feeding means includes a motor and transmission means changed by said clutch means and capable of transmitting a driving force of the motor to the film take-up spool.

23. A camera according to claim 22, wherein said transmission means has a sprocket engageable with perforations of the film.

24. A camera according to claim 19, wherein said clutch means comprises a planetary clutch mechanism formed of a planetary gear mechanism.

25. A camera comprising:
mask means for defining a first photographing frame size;
mask opening limitation means for defining a second photographing frame size smaller than the first photographing frame size by intruding into said mask means;
film feeding means for feeding a film across said mask means;
clutch means for changeover between a first feeding state for preliminary winding of the film and a second feeding state for ordinary winding;
selection means for selecting one of the first photographing frame size and the second photographing frame size from a position outside of the camera;
frame size changeover means capable of changing the photographing frame size responsive at least to said selection means;
control means for controlling said frame size changeover means and said film feeding means so that when a film is set in the camera, an opening in the mask is changed to the second photographing frame size by said frame size changeover means irrespective of the frame size selected by said selection means and, thereafter, the first feeding state is selected to feed the film toward a film take-up spool, and the film fed to the spool is wound around the spool.

26. A camera according to claim 25, wherein said mask opening limitation means includes a projection for preventing a leading end portion of the film from being caught by an end portion of said mask means.

27. A camera according to claim 26, wherein said projection has a slant surface for guiding the leading end portion of the film away from said mask means.

28. A camera according to claim 25, wherein said film feeding means includes a motor and transmission means changed by said clutch means and capable of transmitting a driving force of the motor to the film take-up spool.

29. A camera according to claim 28, wherein said transmission means has a sprocket engageable with perforations of a film.

30. A film loading mechanism according to claim 25, wherein said clutch means comprises a planetary clutch mechanism formed of a planetary gear mechanism.

31. A camera comprising:
mask means having an opening for defining a first photographing frame size;
mask opening limitation means capable of moving to a position intruding into said mask means and a position retracted from said mask means;
film feeding means for feeding a film across said mask means; and
setting means responsive to said film feeding means for setting, during film feeding, said mask opening limitation means to a position at which said mask opening limitation means intrudes into said mask means to prevent an end of a film leader from entering into said opening.

32. A camera capable of changing a photographing frame, comprising:
a main body having a photographing frame mask for defining a photographing frame size;
frame changeover means for enabling the photographing frame mask to be changed to a frame size smaller than a frame size normally defined by said frame mask;
film winding means for winding up a length of film corresponding to one frame each time exposure of a film frame is completed;
preliminary film winding means for automatically setting a film in a state of being ready for photography when a film is placed in the camera; and
external operation means exposed to an outer side of a camera body, said external operation means for selecting one of the frame size defined by the frame mask of said main body and the smaller frame size;
wherein during an operation from said film winding means to said preliminary film winding means, said preliminary winding means causes said frame changeover means to operate so as to form in the frame mask of said main body the frame size smaller than the frame size normally defined by the frame mask, wherein when a photographing frame in accordance with the frame size defined by the frame mask of said main body is selected by said external operation means, an operation of said frame changeover means is cancelled after completion of preliminary film winding to set a photographing frame in conformity with the frame mask formed in said main body, and wherein when a photographing frame in accordance with the smaller photographing frame size is selected by said external operation means, an operation of said frame changeover means is not cancelled and a photographing frame in accordance with the smaller frame size is maintained.

33. A camera according to claim 32, wherein said frame changeover means changes a photographing frame size between an ordinary frame size and a panoramic size.

34. A camera according to claim 32, wherein said preliminary film winding means has a sprocket engageable with perforations of a film, said sprocket being driven to feed a film to a spool of said film winding means.

35. A camera according to claim 32, wherein said preliminary film winding means enables a spool of a self-driving type film cartridge to be driven.

36. A camera having a function of limiting a photographing frame, comprising:
a main body having a frame mask with an opening defining a photographing frame size;
frame limitation means for enabling the opening of said frame mask to be reduced;
film winding means for winding up a length of film corresponding to one frame each time exposure of one frame on a film is completed; and
preliminary film winding means for automatically setting a film in a state of being ready for photography when a film is placed in the camera;
wherein during an operation of said preliminary film winding means, said preliminary film winding means causes said frame limitation means to move to a first position forming in the frame mask of said main body an opening smaller than the opening of the frame mask, and wherein after completion of preliminary winding, movement of said frame limitation means to the first position is cancelled to set a photographing frame size in conformity with the frame mask formed in said main body.

37. A camera according to claim 36, wherein said preliminary film winding means has a sprocket engageable with perforations of a film, said sprocket being driven to feed a film to a spool of said film winding means.

38. A camera according to claim 36, wherein said preliminary film winding means enables a spool of a self-driving type film cartridge to be driven.

39. A camera capable of changing a photographing frame, comprising:
- a main body having a frame mask for defining a photographing frame size opening;
- frame changeover means for enabling the photographing frame size to be changed so as to have a frame size opening smaller than the frame size opening defined by said frame mask; and
- external operation means accessible from an outer side of a camera body, said external operation means including a manually operable member for selecting a photographing frame opening in accordance with one of a frame size defined by the frame mask of said main body and a smaller frame size, said frame changeover means being directly driven by said external operation means and independently of any other camera function.

40. A camera capable of changing a photographing frame, comprising:
- a main body having a frame mask for defining a photographing frame size opening;
- frame changeover means for enabling a photographing frame to be changed so as to have a frame size smaller than the frame size opening defined by said frame mask;
- electrical drive means for outputting a driving force to wind a film;
- film winding means for winding up a length of film corresponding to one frame each time exposure of one frame on a film is completed;
- preliminary film winding means for automatically setting a film in a state of being ready for photography when a film is placed in the camera; and
- external operation means accessible at an outer side of a camera body, said external operation means for selecting a photographing frame in accordance with one of a frame size defined by the frame mask of said main body and a smaller frame size;
- wherein during an operation from said film winding means to said preliminary film winding means, said preliminary winding means causes said frame changeover means to operate so as to form in the frame mask of said main body a frame size smaller than the frame size defined by the frame mask, wherein when a photographing frame in accordance with a frame size defined by the frame mask of said main body is selected by said external operation means, said electric motor drive means is supplied with a control signal such that operation of said frame changeover means is cancelled after completion of preliminary film winding to set a photographing frame in conformity with the frame mask formed in said main body, and wherein when the photographing frame in accordance with the smaller photographing frame size is selected by said external operation means, operation of said frame changeover means is not cancelled and a photographing frame in accordance with the smaller frame size is maintained.

41. A camera according to claim 40, wherein said frame changeover means changes a photographing frame size between an ordinary frame size and a panoramic size.

42. A camera according to claim 40, wherein said preliminary film winding means has a sprocket engageable with perforations of a film, said sprocket being driven to feed a film to a spool of said film winding means.

43. A camera according to claim 40, wherein said preliminary film winding means enables a spool of a self-driving type film cartridge to be driven.

44. A camera having a function of limiting a photographing frame, comprising:
- a main body having a frame mask having an opening defining a photographing frame size;
- frame limitation means for enabling the opening of said frame mask to be reduced;
- electric drive means for outputting a driving force to wind a film;
- film winding means for winding up a length of film corresponding to one frame each time exposure of one film frame is completed; and
- preliminary film winding means for automatically setting a film in a state of being ready for photography when a film is placed in the camera;
- wherein during an operation from said film winding means to said preliminary film winding means, said preliminary film winding means causes said frame limitation means to form in the frame mask of said main body an opening smaller than the opening of the frame mask, and wherein after completion of preliminary winding, said electric drive means is supplied with a control signal such that the operation of said frame limitation means is cancelled to set the photographing frame in conformity with the frame mask opening formed in said main body.

45. A camera according to claim 44, wherein said preliminary film winding means has a sprocket engageable with perforations of a film, said sprocket being driven to feed a film to a spool of said film winding means.

46. A camera according to claim 44, wherein said preliminary film winding means enables a spool of a self-driving type film cartridge to be driven.

47. A camera capable of changing a photographing frame, comprising:
- a photographing frame mask having an opening formed in a camera body;
- electrical drive means;
- frame changeover means capable of forming in said photographing frame mask a small frame having a size smaller than a size of said photographing frame mask by a driving force of said electrical drive means;
- film winding means;
- preliminary film winding means for automatically setting a film in a state of being ready for photography when a film is placed in the camera;
- transmission means for transmitting a driving force of said electrical drive means to said frame changeover means;
- said transmission means including a planetary gear mechanism having a sun gear, a planet gear and a connection lever which connects the sun gear and the planet gear, and wherein when the planet gear rotates around the sun gear, the connection lever engages said frame changeover means to change a photographing frame size.

48. A camera according to claim 47, wherein said frame changeover means changes a photographing frame size between an ordinary frame size and a panoramic size.

49. A camera according to claim 47, wherein said preliminary film winding means has a sprocket engageable with perforations of a film, said sprocket being driven to feed a film to a spool of said film winding means.

50. A camera according to claim 47, wherein said preliminary film winding means enables a spool of a self-driving type film cartridge to be driven.

51. A camera according to claim 47 wherein said electric drive means comprises a motor.

52. A camera comprising:
a camera body having first and second cavities for respectively receiving a film cartridge and a take-up spool;
a frame positioned between said first and second cavities and having an opening of a given size defining a picture frame size for a film drawn across said opening;
movable frame means arranged adjacent to said opening and movable between a first position reducing the size of said opening and a second position uncovering said opening;
a drive motor;
means responsive to rotation of said drive motor in a first direction for operating said movable frame means to said first position and for advancing a leader strip of a film from a film cartridge placed in said cavity across said opening and toward said take-up spool; and
means responsive to rotation of said motor in a second direction opposite said first direction for disengaging said film advancing means from said motor and for coupling said motor to said take-up spool for winding said leader strip about said take-up spool.

53. The apparatus of claim 52 further comprising means for initially driving said motor in said first direction and including means responsive to feeding a predetermined length of film from said film cartridge for reversing a direction of rotation of said motor.

54. The apparatus of claim 52 wherein said means responsive to rotation of said motor comprises:
a sun gear;
a planetary gear meshing with said sun gear and selectively rotatable in one of two opposing directions responsive to a rotation direction of said sun gear;
means coupled between an output of said motor and said sun gear for selectively rotating said sun gear in one of two opposing directions responsive to a rotation direction of the output of said motor;
means for driving a leader strip from a film cartridge when engaged by said planetary gear; and
means for rotating said take-up spool when engaged by said planetary gear.

55. The apparatus of claim 54 wherein said means for driving a leader strip from a film cartridge includes sprocket drive means.

56. The apparatus of claim 54 wherein said take-up spool includes claws for engaging and winding a film strip about said take-up spool.

57. The apparatus of claim 56 wherein said take-up spool is a hollow, substantially cylindrical-shaped member;
said motor means being housed within said take-up spool.

58. The apparatus of claim 52 further comprising means for reducing a frame size opening to prevent a lead strip from entering said frame size opening responsive to movement of said planetary gear toward engagement with said means for driving a leader strip.

59. The apparatus of claim 58 wherein said means for reducing said frame size opening further includes means for guiding a film leader strip away from said frame size opening.

60. The apparatus of claim 58 wherein said means for reducing the frame size opening further includes means responsive to movement of the planetary gear away from means for driving a film leader strip to uncover said frame size opening.

61. A camera comprising:
a camera body having first and second cavities for respectively receiving a film cartridge and a take-up spool;
a frame positioned between said first and second cavities and having an opening of a given size defining a picture frame size for a film drawn across said opening;
movable frame means arranged adjacent to said opening and movable between a first position reducing the size of said opening and a second position uncovering said opening;
a drive motor;
means responsive to rotation of said drive motor in a first direction for operating said movable frame means to said first position and for advancing a leader strip of a film from a film cartridge placed in said cavity across said opening and toward said take-up spool;
means responsive to rotation of said motor in a second direction opposite said first direction for disengaging said film advancing means from said motor and for coupling said motor to said take-up spool for winding said leader strip about said take-up spool;
means for reducing a frame size opening to prevent a lead strip from entering said frame size opening responsive to movement of said planetary gear toward engagement with said means for driving a leader strip;
manually operable means accessible from an outer side of a camera body of said camera for selectively moving said means for reducing a frame size opening between said position reducing a size of said frame size opening and uncovering said frame size opening when respectively moved to first and second operating positions; and
means for overriding the manually operable means when in said first operating position responsive to movement of said planetary gear in a direction toward engagement with said means for driving a leader strip.

62. A camera according to claim 39 further comprising means responsive to movement of frame changeover means to a position selected by said external operation means for stopping said frame changeover means.

63. A camera according to claim 62 wherein said frame changeover means includes an electric motor, said movement responsive means including means for stopping said motor.

64. A camera capable of changing a photographing frame, comprising:

a main body having a frame mask for defining a photographing frame size opening;

frame changeover means for enabling the photographing frame size to be changed so as to have a frame size opening smaller than the frame size opening defined by said frame mask;

external operation means accessible from an outer side of a camera body, said external operation means including a manually operable member for selecting a photographing frame opening in accordance with one of a frame size defined by the frame mask of said main body and a smaller frame size, said frame changeover means being directly driven by said external operation means and independently of any other camera function;

means responsive to movement of frame changeover means to a position selected by said external operation means for stopping said frame changeover means; and said means responsive to movement including a printed circuit and a contact slidable on said printed circuit;

movement of said frame changeover means causing movement of said contact relative to said printed circuit between a first and a second position.

65. A camera according to claim 64 wherein said first position corresponds to a position of said frame changeover means to provide a frame size opening defined by said frame mask and said second position corresponds to a position of said frame changeover means for providing a smaller size opening.

66. A camera according to claim 1 further comprising:

means for feeding said distal end of said film towards said aperture; and said setting means being operative to forcibly set said limitation means responsive to operation of said means for feeding.

67. A camera according to claim 66 further comprising:

means for winding said distal end of said film about a take-up spool responsive to said means for feeding; and said setting means retracting said limitation means responsive to operation of said means for winding.

* * * * *